G. E. ECKEL.
BICYCLE ATTACHMENT.
APPLICATION FILED SEPT. 12, 1916.
1,211,303.
Patented Jan. 2, 1917.
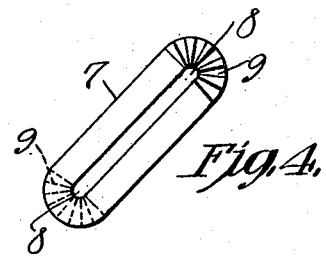
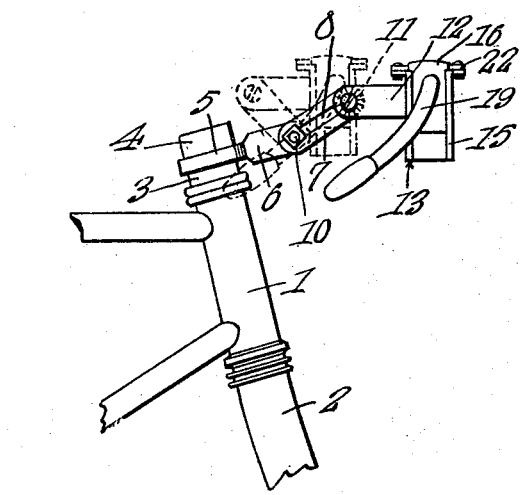
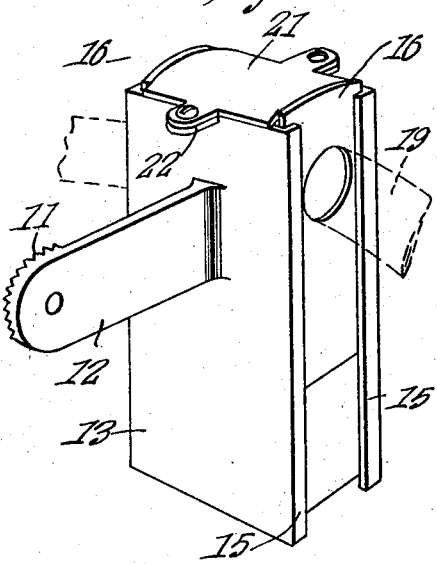
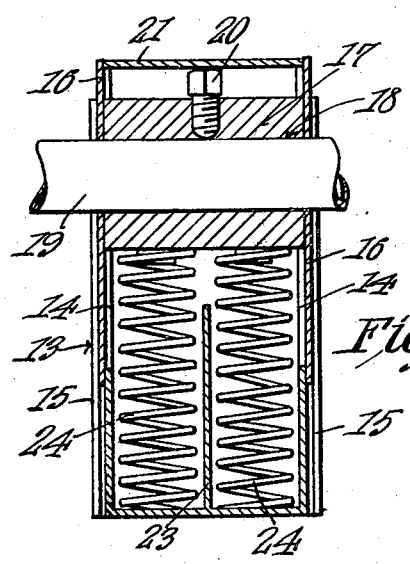
G. E. Eckel,
Inventor,
Witnesses

UNITED STATES PATENT OFFICE.

GUY E. ECKEL, OF RUSHVILLE, NEW YORK.

BICYCLE ATTACHMENT.

1,211,303.   Specification of Letters Patent.   Patented Jan. 2, 1917.

Application filed September 12, 1916. Serial No. 119,762.

*To all whom it may concern:*

Be it known that I, GUY E. ECKEL, a citizen of the United States, residing at Rushville, in the county of Yates and State of New York, have invented a new and useful Bicycle Attachment, of which the following is a specification.

This invention relates to attachments for bicycles, its object being to provide a yieldable support for the handle bars of a bicycle, motorcycle or the like, so that a large percentage of the jolting to which the hands are ordinarily subjected, will be eliminated.

A further object is to provide a novel connection between the handle bars and the steering head whereby said handle bars can be readily adjusted to bring the grips to desired positions relative to the rider.

Another object is to provide an attachment of this character which is simple, durable and compact in construction and can be readily applied to an ordinary bicycle or motorcycle for use in lieu of the ordinary handle bars.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the steering head of a bicycle or the like and showing the present improvements combined therewith, one of the positions to which the handle bars may be moved, being indicated by dotted lines. Fig. 2 is a perspective view of the head of the attachment. Fig. 3 is a vertical transverse section through the head, a portion of the handle bar being shown therein. Fig. 4 is an elevation of the connecting link forming a part of the attachment.

Referring to the figures by characters of reference 1 designates the steering head of a bicycle or the like, the fork being indicated at 2, while the upper end of the stem of the fork is engaged by superposed nuts 3 and 4. Interposed between the nuts 3 and 4 is a ring 5 extending from a bracket 6, the nuts 3 and 4 serving to bind upon the ring so as to cause the bracket 6 to turn with the fork 2. A link 7 having a longitudinal bolt receiving slot 8 may be used in connection with the bracket 6, this link having a series of teeth 9 radiating from each end of slot 8 and one set of these teeth are adapted to engage corresponding teeth on one face of the bracket 6. When a bolt 10 is inserted through the bracket and also through slot 8, the link 7 can be clamped tightly against one side of the bracket 6 and will thus be held against movement relative to the bracket. Obviously the bolt can be clamped either in one end or between the ends of the slot. The other end of the link is adapted to engage the toothed face 11 of an arm 12 extending from the head 13 of the attachment. This head consists of a housing preferably substantially oblong and which housing has elongated openings 14 in the sides thereof. Parallel guide plates 15 are formed along the sides of the housing and serve to guide and retain slides 16 formed with or secured to the sides of a block 17 which is movably mounted in the housing. This block has an opening 18 extending therethrough for the reception of a handle bar 19 and a set screw 20 is extended downwardly into the block and is designed to engage the handle bar to hold it against movement relative to the block. A cap 21 is extended over the set screw and is secured to lugs 22 extending in opposite directions from the housing. By removing this cap the block 17 and the plates 16 carried thereby can be lifted out of engagement with the housing.

Arranged within the housing is a partition 23 dividing the interior of the housing into separate pockets, each of which contains a coiled spring 24. These springs serve to support the block 17.

It will be apparent that by providing an attachment such as described, the springs 24 will constitute cushioning supports for the handle bar and excessive jolting of the hands grasping the bar will be avoided. Furthermore by providing the particular connection between the head 13 and the bracket 6, the handle bar can be adjusted toward or from the steering head and can be raised or lowered bodily, thus to bring the grips to any desired positions. The plates 16 serve to constantly close the side openings 14 with the result that dirt and moisture cannot easily enter the housing.

If desired link 10 may be dispensed with and the arm 12 connected directly to the bracket 6.

Obviously a device such as herein described can be cheaply manufactured, readily applied, and is not only advantageous because of the minute adjustments which may be effected, but also because the jars will always be absorbed no matter to what position the handle bar may be moved relative to the steering head.

What is claimed is:—

1. An attachment for bicycles and the like, including a head, said head having opposed longitudinal openings, a block slidably mounted within the head, yieldable supporting means for the block, handle bars extending through the block, means for securing the handle bars to the block, a cap upon the head and extending over the block to retard the upward movement of the block, and means for connecting the head to a bicycle or the like.

2. The combination with a steering fork and head of a bicycle or the like, of an attachment comprising a housing, a yieldingly supported block slidably mounted therein, a handle bar extending through the block and beyond the sides of the housing, means within the block for engaging the handle bar to hold it against movement relative to the block, means detachably connected to the housing and extending over the block to retard the upward movement of said block, and an adjustable connection between said housing and the steering fork.

3. An attachment for bicycles and the like, including a housing having opposed longitudinal slots, a yieldingly supported block within the housing, said block having an opening for the reception of a handle bar, means carried by the block for engaging the handle bar and holding it against rotation within the opening, a cap detachably connected to the housing and extending over the block to limit the movement of the block in one direction, an arm extending from the block, and means adjustably engaging the arm for connecting the housing to a bicycle or the like.

4. An attachment for bicycles and the like, including a housing having opposed longitudinal slots, a yieldingly supported block within the housing, said block having an opening for the reception of a handle bar, means carried by the block for engaging the handle bar and holding it against rotation within the opening, a cap detachably connected to the housing and extending over the block to limit the movement of the block in one direction, means movable with the block for closing the openings in the sides of the housing, and means for adjustably connecting the housing to a bicycle or the like.

5. An attachment for bicycles and the like, including a housing having opposed longitudinal slots, a yieldingly supported block within the housing, said block having an opening for the reception of a handle bar, means carried by the block for engaging the handle bar and holding it against rotation within the opening, a cap detachably connected to the housing and extending over the block to limit the movement of the block in one direction, means movable with the block for closing the openings in the sides of the housing, and means for adjustably connecting the housing to a bicycle or the like, said means including an arm, a link adjustably connected to the arm, a ring, and an arm upon the ring and adjustably connected to the link.

In testimony that I claim the foregoing as my own, I have hereto affixed my signature in the presence of two witnesses.

GUY E. ECKEL.

Witnesses:
WILLIAM JOHNSON,
ELMER J. NORTHRUP.